United States Patent
Nishida et al.

(10) Patent No.: US 12,529,825 B2
(45) Date of Patent: Jan. 20, 2026

(54) INTEGRATING SPHERE

(71) Applicant: YOKOGAWA ELECTRIC CORPORATION, Tokyo (JP)

(72) Inventors: Kazufumi Nishida, Musashino (JP); Kumiko Horikoshi, Musashino (JP); Hitoshi Hara, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 562 days.

(21) Appl. No.: 17/822,661

(22) Filed: Aug. 26, 2022

(65) Prior Publication Data
US 2023/0062325 A1   Mar. 2, 2023

(30) Foreign Application Priority Data
Aug. 30, 2021 (JP) ................. 2021-140491

(51) Int. Cl.
*G02B 1/18* (2015.01)
*G01J 3/02* (2006.01)
*G02B 5/02* (2006.01)
*G02B 5/10* (2006.01)

(52) U.S. Cl.
CPC .............. *G02B 1/18* (2015.01); *G01J 3/0254* (2013.01); *G02B 5/0226* (2013.01); *G02B 5/0284* (2013.01); *G02B 5/10* (2013.01)

(58) Field of Classification Search
None
See application file for complete search history.

(56) References Cited

U.S. PATENT DOCUMENTS

| 6,222,623 B1 | 4/2001 | Wetherell |
| 2005/0280815 A1* | 12/2005 | Ingleson .............. G01J 1/04 356/304 |
| 2022/0299682 A1 | 9/2022 | Suzuki et al. |

FOREIGN PATENT DOCUMENTS

| JP | 7-146175 A | 6/1995 |
| JP | 2000-26844 A | 1/2000 |
| JP | 2005-275015 A | 10/2005 |
| JP | 2006-226749 A | 8/2006 |
| JP | 2009-281899 A | 12/2009 |
| JP | 2010-259374 A | 11/2010 |
| JP | 2016218000 A | * 12/2016 |
| JP | 2018-128550 A | 8/2018 |

(Continued)

OTHER PUBLICATIONS

European Office Action dated Jul. 17, 2024 issued in European patent application No. 22192536.5.

(Continued)

*Primary Examiner* — Phu Vu
(74) *Attorney, Agent, or Firm* — RANKIN, HILL & CLARK LLP

(57) ABSTRACT

An integrating sphere (10) of the present disclosure includes a hollow member (1) and a diffusive coating (4), on the inner surface of the hollow member (1), configured to scatter and reflect light from a light source within the hollow member (1) to yield diffused light. The diffusive coating (4) is coated with a hydrophobic coating (5). The accuracy of optical measurements using the integrating sphere (10) is improved by suppressed moisture absorption of the integrating sphere (10) and suppressed fluctuations in the efficiency of the integrating sphere (10).

4 Claims, 3 Drawing Sheets

(56) References Cited

FOREIGN PATENT DOCUMENTS

WO    WO-2021084977 A1 *    5/2021    ................ F21V 3/02

OTHER PUBLICATIONS

Japanese Office Action (JPOA) dated Jan. 23, 2024 for Japanese Patent Application No. 2021-140491; English translation.
Japanese Office Action (JPOA) dated Jun. 25, 2024 for Japanese Patent Application No. 2021-140491; English machine translation.
Chinese Office Action dated Aug. 9, 2025 issued for Chinese patent application No. 202211026038.7 and its English machine translation.

* cited by examiner

Comparative Example

Example 1

INTEGRATING SPHERE

CROSS-REFERENCE TO RELATED APPLICATION

The present application claims priority to Japanese Patent Application No. 2021-140491 filed on Aug. 30, 2021, the entire contents of which are incorporated herein by reference.

TECHNICAL FIELD

The present disclosure relates to an integrating sphere.

BACKGROUND

An integrating sphere is an optical component used to diffuse light from a light source uniformly. For example, Patent Literature (PTL) 1 discloses a total luminous flux measurement apparatus that includes an integrating sphere. Here, in the measurement of the total light intensity of a light source with directionality, the measurement must be repeated for all directions because the measured value changes depending on the direction in which the light intensity is measured. Light from a light source, even a light source with directionality such as a Light Emitting Diode (LED), for example, repeatedly diffuses in the integrating sphere. As a result, the brightness in the integrating sphere becomes uniform. Therefore, by simply measuring the brightness inside the integrating sphere once, a measured value proportional to the total light intensity emitted by the light source is obtained. Light from the light source is repeatedly scattered and reflected inside the integrating sphere to become homogeneous, however, and a portion of the light reaches the detector. The measured value is therefore attenuated according to the reflectance in the integrating sphere. The proportion of usable light among the light incident on the integrating sphere is referred to as the efficiency of the integrating sphere. When an integrating sphere of unknown efficiency is used, a calibration light source with known total luminous flux is measured, and the light intensity relative to the calibration light source is measured to determine the total luminous flux of the measurement target. Changes in the efficiency of the integrating sphere during a series of measurements using the integrating sphere would lead to measurement errors. It is therefore important to prevent fluctuations in the efficiency of the integrating sphere.

CITATION LIST

Patent Literature

PTL 1: JP H07-146175 A

SUMMARY

An integrating sphere according to some embodiments includes a hollow member and a diffusive coating, on an inner surface of the hollow member, configured to scatter and reflect light from a light source within the hollow member to yield diffused light, wherein the diffusive coating is coated with a hydrophobic coating.

DETAILED DESCRIPTION

Figure 1:
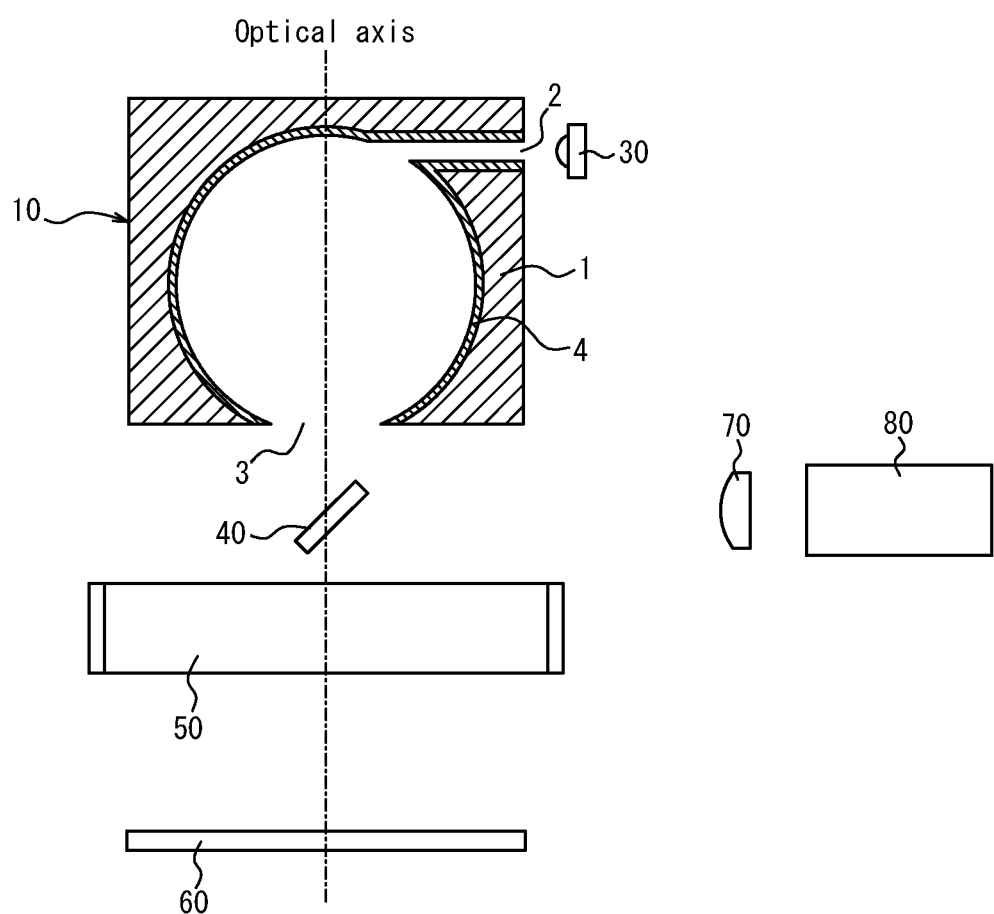
FIG. 1 illustrates an example of applying an integrating sphere according to a Comparative Example applied to a color measurement apparatus.

The efficiency of a known integrating sphere is problematic in that it depends on the dryness of the integrating sphere.

It would be helpful to improve the accuracy of optical measurements using an integrating sphere by suppressing moisture absorption of the integrating sphere and suppressing fluctuations in the efficiency of the integrating sphere.

An integrating sphere according to some embodiments includes a hollow member and a diffusive coating, on an inner surface of the hollow member, configured to scatter and reflect light from a light source within the hollow member to yield diffused light, wherein the diffusive coating is coated with a hydrophobic coating.

This configuration suppresses the absorption of moisture from ambient humidity into the diffusive coating. As a result, a decrease in reflectance of the diffusive coating is suppressed, and fluctuations in the efficiency of the integrating sphere due to ambient humidity are suppressed.

In an embodiment, the hydrophobic coating includes a single hydrophobic resin.

This configuration suppresses the absorption of moisture from ambient humidity into the diffusive coating. As a result, a decrease in reflectance of the diffusive coating is suppressed, and fluctuations in the efficiency of the integrating sphere due to ambient humidity are suppressed.

In the diffusive coating, particles of barium sulfate powder are generally fixed with gaps therebetween, and reflection of the light occurs at the interface between the powder and air, giving rise to diffusivity. When a hydrophobic coating consisting of only a single hydrophobic resin is applied, the hydrophobic resin penetrates between the barium sulfate powder particles and reduces the reflectivity at the interface with the barium sulfate, thus reducing the efficiency of the integrating sphere. The efficiency of the integrating sphere of the present disclosure is lower than that of an integrating sphere without a hydrophobic coating, but fluctuations are suppressed.

In an embodiment, the hydrophobic coating includes a powder of a hydrophobic resin and a binder of a hydrophobic resin.

As a result, light is also reflected at the interface between the hydrophobic resin powder and the hydrophobic resin binder, and the hydrophobic coating has the function of diffusing light. This increases the efficiency of the integrating sphere and suppresses fluctuations in the efficiency of the integrating sphere as compared to application of a hydrophobic coating consisting of only a single hydrophobic resin.

In an embodiment, the powder of the hydrophobic resin is transparent at a wavelength of the light and has a particle size larger than the wavelength of the light.

This configuration suppresses a reduction in the efficiency of the integrating sphere.

In an embodiment, the binder of the hydrophobic resin is transparent at a wavelength of the light and has a refractive index that differs from a refractive index of the powder by 0.02 or more.

This configuration suppresses a reduction in the efficiency of the integrating sphere.

In an embodiment, the hydrophobic resin includes fluoropolymer, silicone resin, polypropylene, polyethylene, or polyethylene terephthalate.

This configuration suppresses a reduction in the efficiency of the integrating sphere.

According to the present disclosure, the moisture absorption of the integrating sphere is suppressed, and fluctuations in the efficiency of the integrating sphere are suppressed, thereby improving the accuracy of optical measurements using the integrating sphere.

An embodiment of the present disclosure is now described with reference to the drawings. Identical reference signs in the drawings indicate identical or equivalent constituent elements.

FIG. 1 illustrates an example of an integrating sphere 10 according to a Comparative Example applied to a color measurement apparatus.

The integrating sphere 10 includes a hollow member 1, a first opening 2 for guiding light from a light source 30 into the hollow member 1, and a second opening 3 for guiding diffused light that was diffused within the hollow member 1 to the outside of the hollow member 1. The first opening 2 is provided at the top (light source 30 side) of the hollow member 1. The second opening 3 is provided at the bottom (light receiving side) of the hollow member 1.

On the inner surface of the hollow member 1, a diffusive coating 4 is provided to scatter and reflect light from the light source 30 within the hollow member 1, thereby yielding diffused light. The diffusive coating 4 generally includes barium sulfate powder and a binder such as polyvinyl alcohol (PVA).

The light from a light source 30 such as a white LED, for example, enters the hollow member 1 from the first opening 2, is sufficiently diffused within the hollow member 1, and is emitted from the second opening 3 as diffused light to the outside of the hollow member 1. A portion of the diffused light emitted from the hollow member 1 is reflected by a cylindrical mirror 50 arranged to surround the optical axis and strikes a measurement target 60. Among the diffused light scattered by the measurement target 60, the diffused light that is directed vertically upward is extracted by a mirror 40 and a collimation lens 70, and the reflected intensity is measured by a spectrometer 80. The reflectance of the measurement target 60 is measured by recording the reflection intensity of a reflective member with known reflectance in advance. Here, the diffused light emitted from the integrating sphere 10 is uniformly distributed. The measurement target 60 is therefore illuminated with the same intensity regardless of direction. Consequently, even if the measurement target 60 has directional characteristics of reflectance, stable measurement is possible regardless of the installation angle of the measurement target 60.

The PVA in the diffusive coating 4, however, is hydrophilic and absorbs moisture from ambient humidity. The PVA that has absorbed moisture swells and ends up filling the gaps between the barium sulfate powder particles, which may reduce the reflectance of the diffusive coating 4. Even a slight reduction in the reflectance of the diffusive coating 4 significantly changes the efficiency of the integrating sphere 10, since light is repeatedly reflected within the integrating sphere 10. The efficiency of the integrating sphere 10 according to the Comparative Example thus fluctuates depending on the ambient humidity, preventing stable measurement. For example, when the total luminous flux of the light source 30 is measured, measurement error occurs if the efficiency of the integrating sphere 10 changes between measurement of the calibration light source and measurement of the light source that is the measurement target 60. When the light source for color measurement is used, measurement error occurs if the efficiency of the integrating sphere changes between measurement of the calibration reflector and measurement of the measurement target 60. This is due to the efficiency of the integrating sphere 10 changing as the integrating sphere 10 dries, due to heat from the light source and the apparatus, until becoming sufficiently dry. In particular, in a color measurement apparatus used to measure the color of paper during production in paper mills, a sensor may be heated and kept at a constant temperature to suppress the effects of temperature changes in the production process. In this case as well, the drying of the integrating sphere 10 progresses, and the efficiency of the integrating sphere 10 may change. To avoid these measurement errors, it has been necessary to wait for several hours until the change in the efficiency of the integrating sphere 10 subsides.

In contrast, the aforementioned problem can be solved according to the present embodiment. In other words, according to the present embodiment, fluctuations in the efficiency of the integrating sphere due to ambient humidity are suppressed. As a result, stable light intensity measurement or color measurement can be realized.

Figure 2:
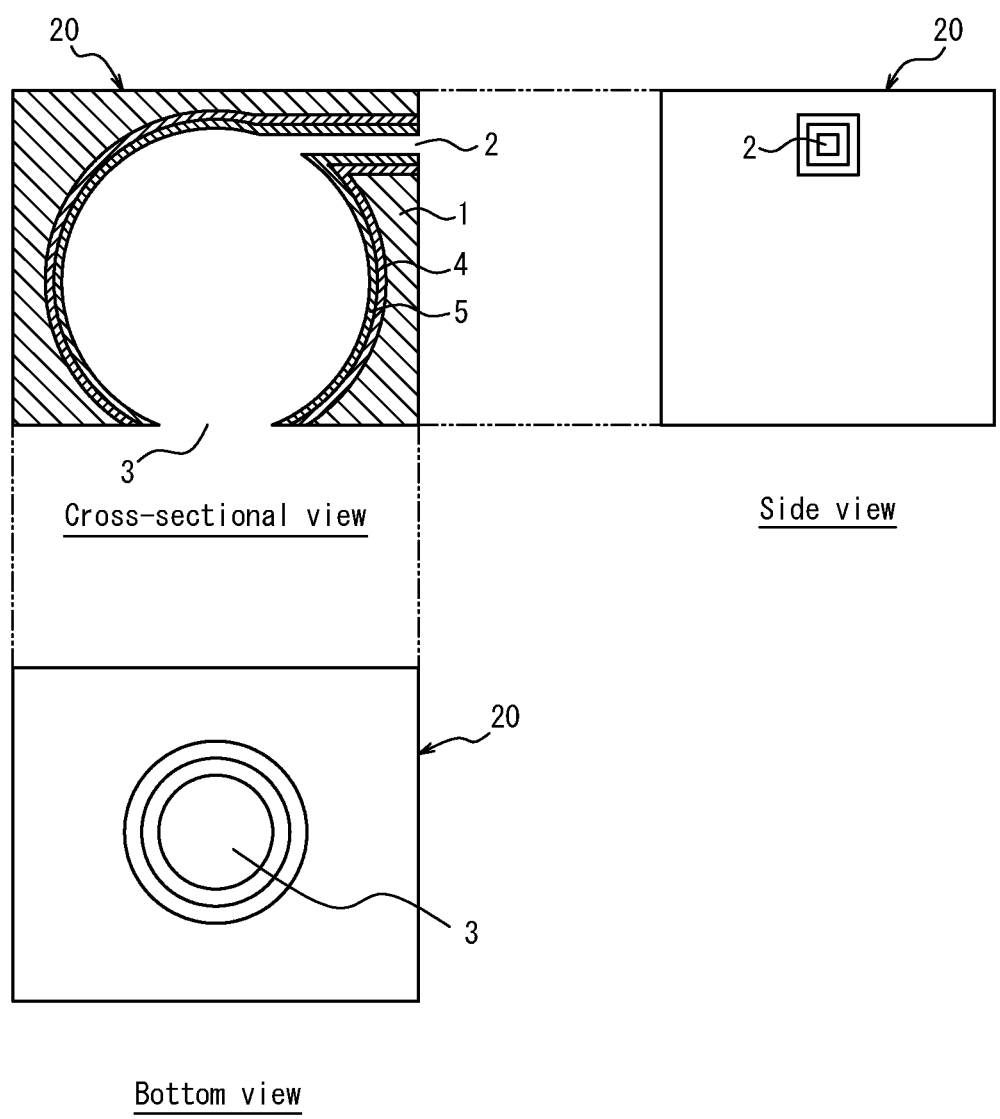
FIG. 2 illustrates an integrating sphere according to an embodiment of the present disclosure.

An integrating sphere 20 according to the present embodiment is now described with reference to FIG. 2.

The integrating sphere 20 includes a hollow member 1, a first opening 2 for guiding light from a light source, and a second opening 3 for guiding diffused light that was diffused within the hollow member 1 to the outside of the hollow member 1. The first opening 2 is provided at the top (light source side) of the hollow member 1. The second opening 3 is provided at the bottom (light receiving side) of the hollow member 1. However, the number of openings provided in the integrating sphere 20 is not limited to this example and may be set freely. For example, a single opening may serve as an input port and output port for light, or the light source may be installed inside the integrating sphere 20. The case in which the integrating sphere 20 includes the first opening 2 and the second opening 3 is described below in detail, but the present disclosure is not limited to this configuration.

On the inner surface of the hollow member 1, a diffusive coating 4 is provided to scatter and reflect light from the light source within the hollow member 1, thereby yielding diffused light.

A hydrophobic coating 5 is coated on the diffusive coating 4. In other words, the hydrophobic coating 5 is provided on the diffusive coating 4.

The hollow member 1 is obtained by using any appropriate or known method to hollow out a metal, such as aluminum, that is easy to process and has high reflectivity so that the inner surface becomes spherical, for example.

The diffusive coating 4 is formed by any appropriate or known spray method or the like on the metal, such as aluminum, that is the material of the hollow member 1. The diffusive coating 4 diffuses light, entering the hollow member 1 from the first opening 2, within the hollow member 1. The diffusive coating 4 can include a powder such as barium sulfate and a binder such as polyvinyl alcohol (PVA). In this case, in the diffusive coating 4, the barium sulfate or other powder is supported by the PVA or other binder.

The hydrophobic coating 5 is applied on the diffusive coating 4. The hydrophobic coating 5 suppresses the absorption of moisture from ambient humidity into the diffusive coating 4. As a result, a decrease in reflectance of the diffusive coating 4 is suppressed, and fluctuations in the efficiency of the integrating sphere 20 due to ambient humidity are suppressed.

The hydrophobic coating 5 can include hydrophobic resins. The hydrophobic resin can include fluoropolymers such as polytetrafluoroethylene (PTFE), silicone resin, polypropylene, polyethylene, or polyethylene terephthalate.

The hydrophobic coating 5 may be formed of a single hydrophobic resin.

Alternatively, the hydrophobic coating 5 may include a hydrophobic resin powder and a hydrophobic resin binder. In this case, in the hydrophobic coating 5, the hydrophobic resin powder is supported by the hydrophobic resin binder. This prevents the hydrophobic resin powder from deeply penetrating between the barium sulfate powder particles in the diffusive coating 4 to fill the space between powder particles. A decrease in the reflectance of the diffusive coating 4 is thereby suppressed. In other words, since the hydrophobic coating 5 has a further function of diffusing light, the decrease in efficiency of the integrating sphere 20 is suppressed.

To enhance the diffusion effect, the hydrophobic resin powder is preferably transparent at the wavelength of light from the light source and preferably has a particle size larger than the wavelength of light. Specifically, the hydrophobic resin powder preferably has a particle size of 0.5 µm or larger in visible light. To enhance the diffusion effect with a limited hydrophobic coating thickness (for example, 50 µm to 1000 µm), the hydrophobic resin powder preferably has a particle size of 50 µm or less. The particle size of the hydrophobic resin powder can be appropriately sorted by a sieve having a mesh equivalent to the particle size.

From the perspective of efficiency of the integrating sphere, the hydrophobic resin binder is preferably transparent at the wavelength of light from the light source and preferably has a refractive index that differs from the refractive index of the hydrophobic resin powder by 0.02 or more.

The mixing ratio between the hydrophobic resin powder and the hydrophobic resin binder is preferably in a range of 0:100 to 50:50 by volume ratio, more preferably from 40:60 to 50:50, from the perspective of efficiency and hydrophobic performance of the integrating sphere as well as the fixing capability of the hydrophobic resin powder.

The hydrophobic resin powder and hydrophobic resin binder are dispersed in a solvent such as butyl acetate and applied to the inner surface of the hollow member 1, which is coated with the diffusive coating 4, by any appropriate or known spray method. The application amount is preferably 50 g to 1000 g (when dry) per square meter. In FIG. 2, a clear interface is formed between the diffusive coating 4 and the hydrophobic coating 5. However, since the hydrophobic resin binder in the hydrophobic coating 5 is fixed by permeating into the diffusive coating 4, a clear interface might not be formed when the hydrophobic coating 5 is composed of a single hydrophobic resin.

EXAMPLES

Comparative Example

In the Comparative Example, a known integrating sphere (barium sulfate powder fixed with PVA, 500 µm film thickness) was used.

Example 1

In Example 1, a hydrophobic coating including a silicone resin as a hydrophobic resin binder and PTFE as a hydrophobic resin powder was applied by the above-described spray method onto the diffusive coating in a known integrating sphere. The particle size of the hydrophobic resin powder was 20 µm. The application amount was 200 g (when dry) per square meter. The mixing ratio between the hydrophobic resin powder and the hydrophobic resin binder was 50:50 by volume ratio.

Example 2

In Example 2, a hydrophobic coating consisting of a single fluoropolymer (specifically, PTFE) was formed on a known integrating sphere.

Figure 3:
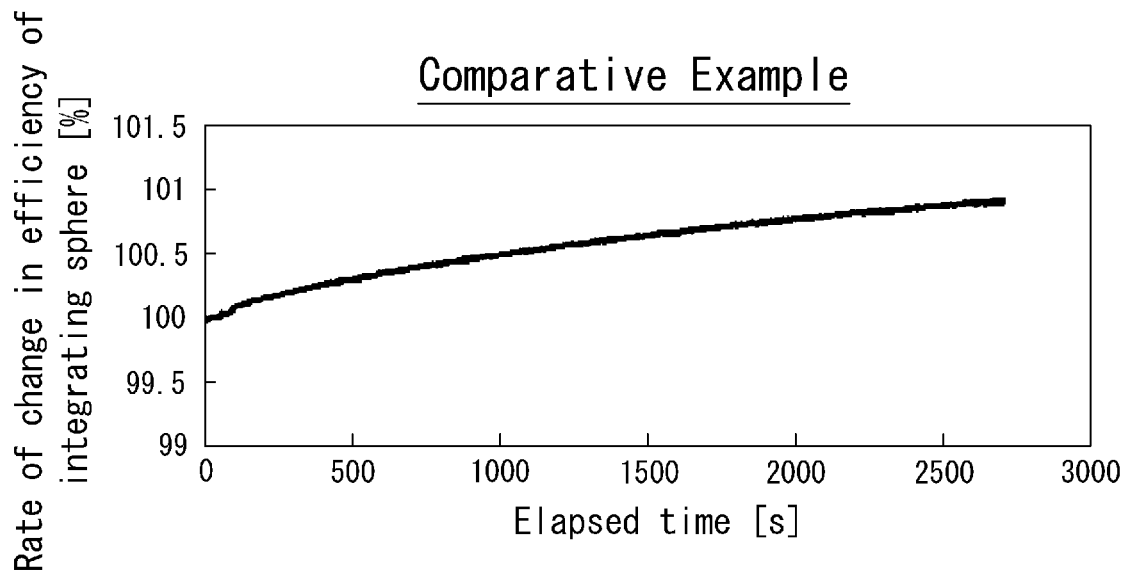
FIG. 3 illustrates the relative time variation in the rate of change of the efficiency of the integrating sphere according to the Comparative Example, with the measurement start time set as 100%.
Figure 4:
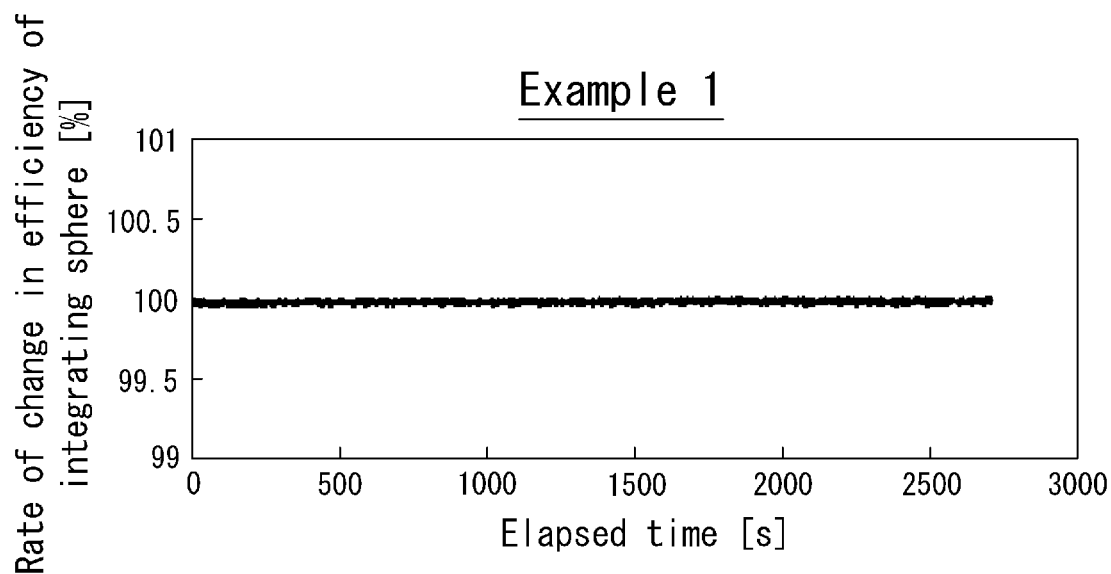
FIG. 4 illustrates the relative time variation in the rate of change of the efficiency of the integrating sphere according to Example 1, with the measurement start time set as 100%.

For each Example and the Comparative Example, the time variation in the rate of change of the efficiency of the integrating sphere was examined. The wavelength of light used for the measurements ranged from 400 nm to 680 nm, and the average light intensity was calculated. FIGS. 3 and 4 illustrate the results. As illustrated in FIG. 3, in the Comparative Example, moisture absorption due to ambient humidity occurred before the power supply was turned on, which reduced the efficiency of the integrating sphere. Once the power supply was turned on, the efficiency of the integrating sphere gradually changed as the equipment temperature rose and the integrating sphere dried out. In contrast, as illustrated in FIG. 4, moisture absorption due to the ambient humidity did not occur in Example 1 even before the power supply was turned on, and the efficiency of the integrating sphere remained constant before and after the power supply was turned on. Whereas only about 30% efficiency was obtained in Example 2 as compared to the Comparative Example, about 60% efficiency was obtained in Example 1 as compared to the Comparative Example.

Although the present disclosure is based on embodiments and drawings, it is to be noted that various changes and modifications may be made by those skilled in the art based on the present disclosure. Therefore, such changes and modifications are to be understood as included within the scope of the present disclosure.

INDUSTRIAL APPLICABILITY

According to the present disclosure, the performance of an integrating sphere is improved in that fluctuations in the efficiency of the integrating sphere due to ambient humidity are suppressed. Also, according to the present disclosure, stable light intensity measurement or color measurement can be achieved. Specifically, optical characteristic measurements using the integrating sphere of the present disclosure can be performed immediately, since the efficiency of the integrating sphere is stable from the moment the power is turned on. More stable measurement can also be achieved even if the ambient humidity changes, since a change in the efficiency of the integrating sphere is suppressed. For example, when the total luminous flux of a light source is measured, changes in the efficiency of the integrating sphere from measurement of the calibration light source to measurement of the light source to be measured are suppressed, thereby suppressing measurement errors. In the case of use in a light source for color measurement, changes in the efficiency of the integrating sphere from measurement of the calibration reflector to measurement of the measurement target are suppressed, thereby suppressing measurement errors. Furthermore, in an apparatus in which the integrating sphere is incorporated, fluctuations in the efficiency of the integrating sphere caused by drying of the integrating sphere, due to heat emitted by the apparatus itself and heat emitted by the light source, are suppressed, enabling stable measurement immediately after the apparatus is turned on. The scope of application of the present disclosure is not, however, limited to the disclosed examples.

The invention claimed is:

1. An integrating sphere comprising:
a hollow member; and
a diffusive coating, on an inner surface of the hollow member, configured to scatter and reflect light from a light source within the hollow member to yield diffused light,
wherein the diffusive coating is coated with a hydrophobic coating,
the diffusive coating comprises barium sulfate powder and a polyvinyl alcohol binder,
the hydrophobic coating includes a powder of a hydrophobic resin and a binder of a hydrophobic resin,
the powder of the hydrophobic resin is transparent at a wavelength of the light, and
the binder of the hydrophobic resin is transparent at a wavelength of the light.

2. The integrating sphere according to claim 1, wherein the powder of the hydrophobic resin has a particle size larger than the wavelength of the light.

3. The integrating sphere according to claim 1, wherein the binder of the hydrophobic resin has a refractive index that differs from a refractive index of the powder by 0.02 or more.

4. The integrating sphere according to claim 1, wherein the hydrophobic resin includes fluoropolymer, silicone resin, polypropylene, polyethylene, or polyethylene terephthalate.

* * * * *